United States Patent [19]

Burton et al.

[11] 4,446,003

[45] May 1, 1984

[54] HEAT RECOVERY PROCESS AND APPARATUS

[75] Inventors: Stephen R. Burton, Kingsbury; Gary Horley, Walsall; Ronald C. Hodrien, Solihull, all of England

[73] Assignee: British Gas Corporation, London, England

[21] Appl. No.: 362,594

[22] Filed: Mar. 29, 1982

[30] Foreign Application Priority Data

Jun. 2, 1981 [GB] United Kingdom ............... 8116905

[51] Int. Cl.³ .............................................. C10G 9/12
[52] U.S. Cl. ................................. 208/48 Q; 208/142
[58] Field of Search .............. 208/48 Q, 142; 55/159, 55/175

[56] References Cited

U.S. PATENT DOCUMENTS

| | | | |
|---|---|---|---|
| 3,174,924 | 3/1965 | Clark et al. | 208/48 Q |
| 3,593,968 | 7/1971 | Geddes | 208/48 Q |
| 3,674,679 | 7/1972 | Washimi et al. | 208/48 Q |
| 3,676,519 | 7/1972 | Dorn et al. | 208/48 Q |
| 3,907,661 | 9/1975 | Gwyn et al. | 208/48 Q |
| 3,923,921 | 12/1975 | Kohfeldt | 208/48 Q |
| 4,121,908 | 10/1978 | Raab et al. | 208/48 Q |
| 4,150,716 | 4/1979 | Ozaki et al. | 208/48 Q |
| 4,233,137 | 11/1980 | Ozaki et al. | 208/48 Q |
| 4,279,734 | 7/1981 | Gwyn | 208/48 Q |

*Primary Examiner*—Delbert E. Gantz
*Assistant Examiner*—Cynthia A. Prezlock
*Attorney, Agent, or Firm*—Larson and Taylor

[57] ABSTRACT

A process for the recovery of heat from the gas leaving a unit for the thermal hydrogenation of an oil feedstock, which process comprises quenching the gas with a quench liquid in a quenching zone in which all the internal surfaces thereof are irrigated by the quench liquid and passing the cooled gas and quench liquid to a heat recovery unit in which all the surfaces thereof in contact with gas are irrigated by the quench liquid.

The process is particularly suitable for the recovery of heat from the gas leaving a fluidized bed hydrogenator.

12 Claims, 3 Drawing Figures

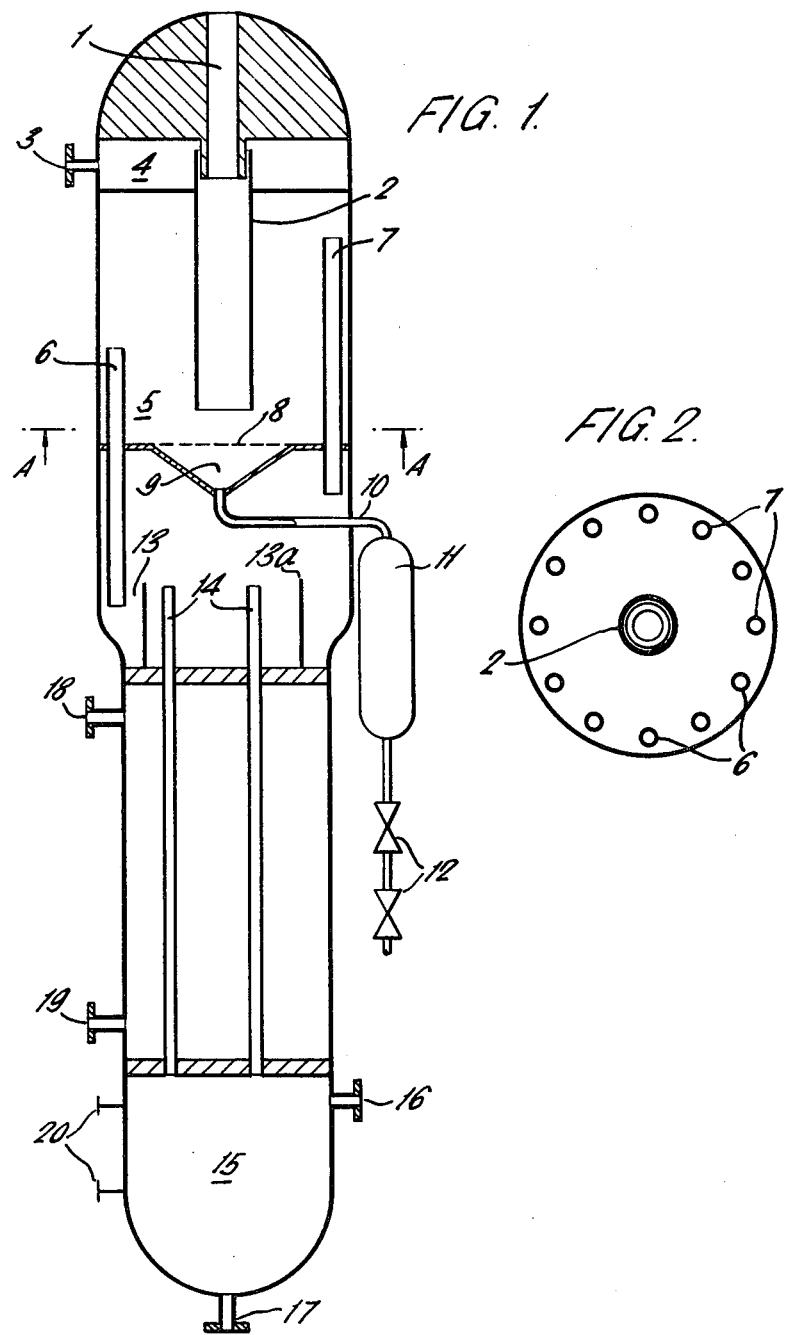

HEAT RECOVERY PROCESS AND APPARATUS

The present invention relates to a process for the recovery of heat from the gas leaving a unit for the thermal hydrogenation of oil feed stock, in particular, the gas leaving a fluidized bed hydrogenator and to apparatus for carrying out this process.

The hot crude gas leaving a thermal hydrogenation unit contains a significant quantity of potentially recoverable, high grade heat. In an integrated gasification scheme this recoverable heat could be used to generate high pressure steam, and hence power, so decreasing the overall fuel requirements of the installation. This in-plant power generation and use, could improve the overall thermal efficiency of a gasification scheme by up to 7.5%

These crude gases, however, contain heavy aromatic compounds which will condense at temperatures as high as about 470° C. and, if allowed to accumulate on the surfaces of the heat recovery systems, will seriously impair heat transfer and reduce the efficiency of the equipment. The heavy aromatic compounds, if not removed, will degrade and will ultimately cause a serious restriction to flow through the heat recovery system.

We have now developed a heat recovery process in which the deposition of heavy aromatic compounds on the surfaces of the heat recovery system is prevented.

Accordingly, the present invention provides a process for the recovery of heat from the gas leaving a unit for the thermal hydrogenation of an oil feedstock, which process comprises quenching the gas with a quench liquid in a quenching zone in which all the internal surfaces thereof are irrigated by the quench liquid and passing the cooled gas and quench liquid to a heat recovery unit in which all the surfaces thereof in contact with the gas are irrigated by the quench liquid.

In carrying out the process of the invention the crude gas is quenched in a quenching zone with a quench liquid, a part of which may be permitted to vaporize. In this zone the gas is cooled rapidly to a temperature below that at which the coking of aromatic compounds contained as vapours in the gas would occur. All of the internal surfaces of the quenching zone are irrigated by the quench liquid which may be supplied thereto by weirs, multiple spray nozzles or similar devices, either separately or in combination. The irrigation of the internal surfaces of the quench zone prevents the deposition of any aromatic compounds thereon. It is not necessary for any condensation of aromatic compounds to be achieved in the quenching zone and, indeed, a net vaporization of the quench liquid will usually occur. The gas should preferably not be cooled in the quenching zone more than is necessary to achieve adequately low coking and fouling rates. A suitable temperature is below 460° C., preferably in the range of from 430° to 440° C. The cooled gas and quench liquid are then fed to the heat recovery unit, preferably a boiler, either in a single pipe or in a separate pipe for each fluid. When the heat recovery unit is a boiler it is essential than even distribution of the quench liquid to each boiler tube is obtained and this may be more easily achieved if the gas and quench liquid are fed in separate pipes. The heat exchange unit is continuously irrigated by the quench liquid, thereby preventing condensation of heavy aromatics on to the internal surfaces thereof. Condensation of some or all of the quench liquid will occur since as heat is removed via the surfaces of the heat recovery unit further condensation will occur. On a net total weight basis therefore any quench liquid vaporized in the quenching zone should be condensed and there is generally a net condensation of aromatic compounds from the gas. The net condensation is a function of the initial loading of aromatic compounds in the gas. In practice, the lighter fractions of the quench liquid will tend to be lost by vaporization and replaced by the heavier fractions of aromatic compounds from the gas.

Any suitable fluid stream may be used for heat recovery on the shell side of the heat recovery unit. As stated above however, the heat recovery unit is preferably a boiler and the heat recovered from the gas is then used to raise steam from pre-heated feed water. At a quench temperature in the range of from 430° to 440° C. it is possible to generate high pressure steam at a pressure of about 1500 lb/in$^2$ (103.4 bar) (saturation temperature 313° C.) while retaining reasonable mean temperature approaches in the exchanger. The use of such a high pressure (and saturation temperature) restricts the amount of heat which can be removed from the gas by steam raising, but the remaining heat (down to about 200° C.) can be usefully employed to preheat the associated boiler feed water.

On leaving the boiler feed water heater the quench liquid and crude gas are separated. The crude gas is then usually cooled from 240° C. to about 40° C. with circulating mixture of benzene, toluene or xylene. Generally, the excess of the liquid stream resulting from the condensation of heavy aromatic compounds from the crude gas is withdrawn and the balance of the liquid recirculated to the quenching zone as discussed in more detail below. This liquid stream may be cooled or heated, as desired, in order to vary the quenching zone exit temperature.

It is necessary for the quench liquid used in the process of the invention to meet the following criteria:
 (i) Under the process conditions some liquid must remain at the quench outlet without requiring excessively large quantities of the quench liquid;
 (ii) The quench liquid must be stable with respect to coking and hydrogenation under the conditions in the quenching zone and the heat recovery unit; and
 (iii) The quench liquid must be readily available.

A quench liquid which meets these criteria is a heavy aromatic liquid, such as a heavy fraction of the condensate from the effluent gas from the thermal hydrogenation unit. This advantageously leads to the use of a simple circulating system since a portion of the liquid product leaving the heat recovery unit may then be recycled to quench the gas leaving the thermal hydrogenation unit. In such a case, if this system is allowed to reach a steady state, then the recycled quench liquid and the net aromatic condensate product would have a mean boiling point of about 550° C. and a molecular weight of at least 300. However, as in all closed loop recycle systems a small proportion of the liquid will have an extremely long residence time and polymerization reactions will have a tendency to occur even though the mean residence time is low. In such a case it is necessary to purge these heavy aromatic compounds and their polymerization byproducts, preferably selectively by bottoming at least part of the circulating quench liquid, for example by vacuum distillation. Further control over the physical properties of the quench liquid is possible by purging off a greater amount than necessary of the recycled liquid and adding a suitable make-up liquid, for example a lighter aromatic condensate fraction.

Whilst the process of the present invention is suitable for the treatment of the gas leaving any type of thermal hydrogenation unit, it is particularly suitable for the treatment of the effluent gases from fluidized bed hydrogenators. Fluidised bed hydrogenators are known, for example as disclosed in our British Patent Specification No. 1,154,321. As is known, the main advantage of fluidised bed hydrogenators is that very heavy oil feedstocks can be successfully gasified. However, the relatively low gasification achieved, typically 55-70%, can mean that considerable quantities of aromatic compounds are contained in the effluent gas. The elutriation of the fine coke particles from a fluidized bed hydrogenator is always a potential problem. However, the process of the present invention can handle suspended solids fairly easily since the amounts of quench liquid used are so large that even if the rate of elutriation of coke particles is equal to the total rate of carbon formation in the fluidized bed hydrogenator, the solids content of the liquid leaving the quenching zone is less than 0.5 wt % and this produces an easily pumpable slurry from which the coke particles can be separated.

The present invention also includes within its scope apparatus for the recovery of heat from gas leaving a unit for the thermal hydrogenation of an oil feedstock, which apparatus comprises a quenching zone which has means for the introduction of the gas thereinto, means for the introduction of a quench liquid thereinto and means for irrigating the internal surfaces of the quenching zone with the quench liquid, and a heat recovery zone which has means for the passage of the gas and quench liquid therethrough, means for the passage of a heat exchange fluid therethrough in heat exchange relationship with the means for the passage of the gas and quench liquid and means for irrigating the internal surfaces of the zone in contact with the gas with the quench liquid.

The present invention will be further described with reference to specific embodiments thereof as illustrated in the accompanying drawings, in which:

FIG. 1 is a sectional side-elevation of an apparatus for carrying out the present invention in which the quench zone, boiler and separator are housed within the same pressure vessel;

FIG. 2 is a cross-section of the apparatus as shown in FIG. 1 taken along the line A—A of FIG. 1.

In the following description of the drawings like numerals are used to designate like parts.

Figure 3:
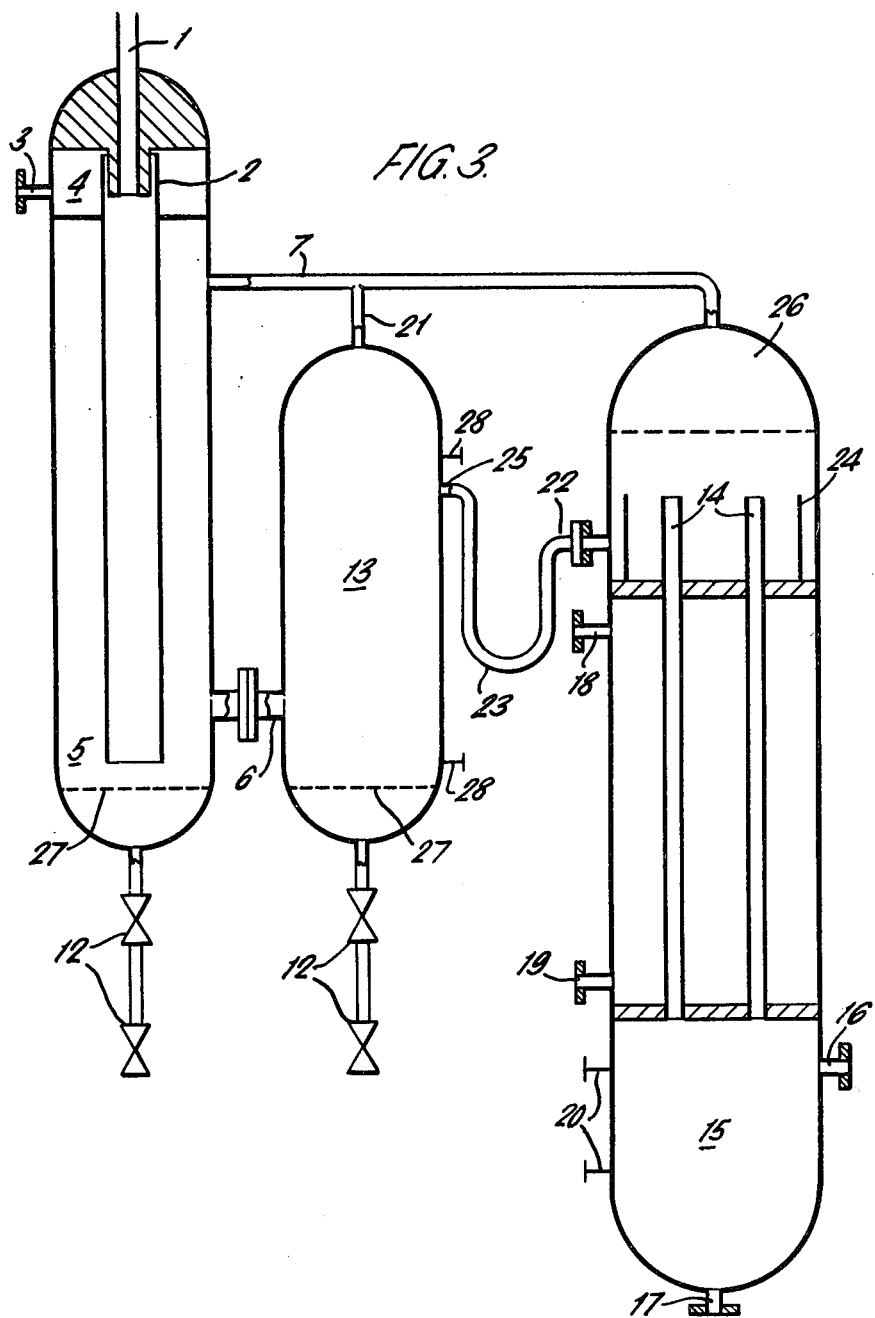
FIG. 3 is a sectional side-elevation of an apparatus for carrying out the present invention in which the quench zone, boiler and separator are housed in separated pressure vessels.

Referring to FIGS. 1 and 2, the crude gas leaving the thermal hydrogenation unit enters the quench zone 5 through insulated pipe 1 and quench pipe 2. Insulated pipe 1 extends below the top of quench pipe 2 in order to prevent premature cooling of the crude gas and to ensure that the quench liquid and the crude gas are in co-current flow before they come into contact. The quench pipe 2 is continuously irrigated by quench liquid overflowing from chamber 4, the liquid being fed to the chamber through pipe 3. This continual irrigation prevents deposition of heavy aromatic compounds onto the wall of pipe 2. A constant liquid height is maintained in the quench zone 5 by the overflow pipes 6 so that the crude gas is cooled by being bubbled through the quench liquid. The quench liquid passes through overflow pipes 6 into the quiescent zone 13, the level of which is maintained by the weir 13(a). The cooled gas is fed into the boiler inlet channel by pipes 7. Six pipes 7 are shown in FIG. 2 but more may be used to improve gas distribution. The quench liquid overflows weir 13(a) enters the upper end of the boiler tubes 14 and means are provided for ensuring a film flow of liquid down the boiler tubes. The cooled gas also enters boiler tubes 14 and flows co-currently downwards with the quenching liquid. The deposition of heavy aromatic compounds onto the boiler tubes is thus prevented by the irrigation of the tubes with the quench liquid. On leaving the boiler tubes 14, the crude gas and quench liquid enter separation zone 15 where they are separated into different streams, the gas leaving by pipe 16 and the liquid by pipe 17, level control instrument connections 20 being provided for control of the liquid level in this zone. The heat transferred from the crude gas to the boiler is used to generate steam, boiler feedwater entering through pipe 19 and a steam/water mixture leaving by pipe 18.

It is sometimes necessary to scrape the surface of inlet pipe to prevent a blockage, the deposits removed from the pipe 1 falling into quench zone 5. The base of the quench zone is thus furnished with a perforated plate 8 through which the deposits can pass into the funnel 9. The funnel 9 can be discharged, as required, through pipe 10 into the receiver 11 by operation of the valves 12.

Referring now to FIG. 3, the crude gas leaving the thermal hydrogenation unit enters the quench zone 5 via insulated pipe 1 and quench pipe 2. Insulated pipe 1 extends below the top of quench pipe 2 in order to prevent premature cooling of the crude gas and to ensure that the quench liquid and the crude gas are in co-current flow before they come into contact. The quench pipe 2 is continuously irrigated by quench liquid overflowing from chamber 4, the liquid being fed to the chamber through pipe 3. This continual irrigation prevents the deposition of heavy aromatic compounds on to pipe 2. A constant liquid height is maintained in the quench zone 5 by the position of outlet 25 of vessel 13, so that the gas is cooled by being bubbled through the quench liquid. The gas leaves the quench zone 5 near the top thereof and is fed directly to the boiler by pipe 7. The quench liquid leaves the quench zone 5 by means of pipe 6 and enters the quiescent zone 13 in which the pulsations in the liquid, caused by the bubbling of the gas, are damped before the liquid is fed to the boiler. An equality of pressure of gas and liquid is ensured by the balancing pipe 21. The quench liquid from the quiescent zone 13 is fed to the inlet of boiler tubes 14 by means of pipe 22 and loopseal 23. An even distribution of quench liquid flow to each of the tubes 14 is maintained by weir 24, and of gas flow to each of the tubes 14 by perforated distribution plate 26. Additional means are provided for ensuring a film flow of liquid down each tube 14. The crude gas and quench liquid both flow down boiler tubes 14 co-currently so that the deposition of heavy aromatic compounds of the tube walls is prevented. On leaving the boiler tubes 14 the crude gas and quench liquid are separated in separation zone 15 where they are separated into different streams, the gas leaving by pipe 16 and the liquid by pipe 17. Control of the liquid level in this zone is required and level control instrument connections 20 are thus provided. The heat transferred by the crude gas to the boiler is used to generate steam, boiler feedwater entering via pipe 19 and a steam/water mixture leaving by pipe 18.

It is sometimes necessary to scrape the surface of inlet pipe 1 to prevent a blockage, the deposits removed from the pipe falling into quench zone 5 and sometimes also being carried over into quiescent zone 13. The base of quench zone 5 and quiescent zone 13 are each furnished with perforated plates or baffles 27 through which the deposits will pass. The material in the bases of the quench and acquiescing zones can be discharged as required by operation of valves 12. It may be necessary to monitor the level of the quench liquid in zone 9 and thus instrument control connections 28 are provided.

In a modification of the apparatus as described with reference to FIGS. 1 and 2, a fluidized bed hydrogenator could also be contained in the same pressure vessel as the quench zone, boiler and separator with the gas off-take from the fluidized bed hydrogenator being centrally disposed through the hydrogenator. In this modification the effluent gas temperature does not fall below the reactor temperature until the quench zone and thus no condensation occurs in the gas off-take line.

The present invention will be further described with reference to the following Examples.

EXAMPLE 1

A crude gas from the thermal hydrogenation of Kuwait atmospheric residue had a composition as follows:

| | |
|---|---|
| Hydrogen | 64.55 mol % |
| Methane | 25 2 |
| Ethane | 5.7 |
| Ethylene | 0.06 |
| Co | 1 2 |
| $CO_2$ | 0 76 |
| Steam | 0.57 |
| $H_2S$ | 0.60 |
| $NH_3$ | 0.27 |
| 1 ring aromatics | 1.20 |
| 2 ring aromatics | 0.43 |
| 3 ring aromatics | 0.24 |
| 4 ring aromatics | 0.07 |
| 5+ ring aromatics | 0.05 |

This gas left the hydrogenator at a flow rate of $4.17 \times 10^6$ s.ft$^3$/hr ($0.1181 \times 10^6$ Sm$^3$/hr) at a temperature of 750° C. and a pressure of 750 psig and entered the quench zone (FIG. 1). Here it was cooled to 441° C. with a heavy aromatic quench liquid stream entering at a temperature of 345° C. and at a rate of 792,000 lb/hr (359244 Kg/hr).

The composition of this quench liquid stream was:

| | |
|---|---|
| 1 ring aromatics | 0.96 mol % |
| 2 ring aromatics | 1.8 |
| 3 ring aromatics | 4.0 |
| 4 ring aromatics | 4.9 |
| 5+ ring aromatics | 88.3 |
| Molecular weight 273 | |

In the quench zone 21,211 lb/hr (9621 Kg/hr) of the quench liquid was vaporized so that the mixed stream entering the boiler comprised $4.19 \times 10^6$ s.ft$^3$/hr ($0.1186 \times 10^6$ sm$^3$/hr) gas and vapour and 770,789 lb/hr (349624 Rg/hr) of quench liquid. Feed water entered the shell side of the boiler at 313.5° C. and 144,000 lb/hr (65317 Kg/hr) of saturated steam at 1500 psig were generated. The crude gas/quench liquid stream left the boiler at 345° C. and comprised $4.16 \times 10^6$ ft$^3$/hour ($1178 \times 10^6$ sm$^3$/hr) gas and vapour and 796,552 lb/hr (361309 Kg/hr) liquid. Hence, there was a net condensation, in the boiler, of 4552 lb/hr (2065 Kg/hr) of aromatic compounds from the crude gas. The mixed stream entered the separator where 4552 lb/hr (2065 Kg/hr) of liquid was withdrawn and the balance pumped back to the quench zone. This take off rate could be increased so as to be higher than the rate of net condensation from the crude gas. A pre-fractionated quench liquid make-up was added to supply the balance and so adjust the overall quality of the quench liquid.

EXAMPLE 2

Kuwait atmospheric residue having a composition as defined in Example 1 was hydrogenated in a fluidized bed hydrogenator. The hydrogen/oil ratio used was 43.15 s.ft$^3$ of hydrogen per pound of oil (2.694 sm$^3$/Kg).

The gas left the fluidized bed hydrogenator at a flow rate of $4.57 \times 10^4$ s.ft$^3$/hr ($0.1294 \times 10^4$ sm$^3$/hr), a temperature of 750° C. and a pressure of 650 psig and entered the quench zone. Here it was cooled to a temperature of 430° C. with a heavy aromatic quench liquid stream entering at a temperature of 345° C. and at a rate of 8,700 lb/hr (3946/Kg/hr). The composition of the quench liquid was as given in Example 1.

In the quench zone 170 lb/hr (77.11 Kg/hr) of the quench liquid were vaporized so that the mixed steam entering the boiler comprised $4.59 \times 10^4$ s.ft$^3$/hr ($0.13 \times 10^4$ sm$^3$ hr) gas and vapor and 8.530 lb/hr (3869/Kg/hr) of quency liquid. The crude gas/quench liquid stream left the boiler at a temperature of 345° C. and comprised 8776 lb/hr (3981 Kg/hr) quench liquid. Hence there was a net condensation in the boiler of 76 lb/hr (34.47 Kg/hr) of aromatic compounds from the crude gas which represents about 25 wt% of the original aromatic compounds contained in the gases leaving the hydrogenator. The duty of the boiler is around $1 \times 10^6$ Btu/hr (293100 KW) and around 1250 lb/hr of high pressure (1500 psig) steam can be raised in the boiler.

We claim:

1. A process for the recovery of heat from the gas leaving a unit for the thermal hydrogenation of an oil feedstock, said process comprising:
    providing a quench zone and a heat recovery zone, said heat recovery zone comprising a plurality of heat exchanger tubes having inlet and outlet ends and means for maintaining a body of quiescent quench liquid adjacent the inlet ends of said heat exchanger tubes, a space being present above said body of quiescent quench liquid in said heat recovery zone;
    irrigating all of the internal surfaces of said quench zone with a quench liquid;
    introducing gas from said thermal unit into said quench zone to quench the gas by contact with said quench liquid;
    separating quenched gas from said quench liquid in said quench zone;
    passing separated quench liquid from said quench zone through first conduit means to said heat recovery zone;
    maintaining a quiescent body of quench liquid adjacent the inlet ends of said heat exchanger tubes, the outlet end of said first conduit means being located within said quiescent body of quench liquid whereby quench liquid passed from said quench zone to said heat recovery zone is introduced into said body of quiescent liquid;

maintaining the level of said quiscent body of quench liquid above the inlet end of said heat exchanger tubes whereby quench liquid flows into and irrigates all of said heat exchanger tubes; and passing separated quenched gas from said quench zone through second conduit means to the space above said body of quiescent quench liquid in said heat recovery zone whereby the quenched gas flows with the quench liquid into and through said heat exchanger tubes.

2. A process as claimed in claim 1 wherein the quench liquid is a heavy aromatic liquid.

3. A process as claimed in claim 1 or claim 2 wherein a partial vaporization of the quench liquid occurs in the quenching zone.

4. A process as claimed in claim 1 wherein the gas is cooled in the quenching zone to a temperature below 460° C.

5. A process as claimed in claim 4 wherein the gas is cooled in the quenching zone to a temperature in the range of from 430° to 440° C.

6. A process as claimed in claim 1 wherein the heat recovery unit is a boiler.

7. A process as claimed in claim 6 wherein the boiler is used to generate steam at a pressure of about 15 lb/in$^2$ (1034 bar).

8. A process as claimed in claim 7 wherein the heat remaining in the gas after the steam generation is used to preheat the feed water to the boiler in a second heat exchanger.

9. A process as claimed in claim 1 wherein the quench liquid and gas are separated on leaving the heat recovery unit.

10. A process as claimed in claim 9 wherein at least a portion of the quench liquid is recycled to the quenching zone.

11. A process as claimed in claim 1 wherein the gas is effluent gas from a fluidized bed hydrogenator.

12. A process for recovery of heat from the gas leaving a unit for the thermal hydrogenation of an oil feedstock, which process comprises:

maintaining a body of quench liquid in a lower portion of a quenching zone;

introducing quench liquid into a conduit having an outlet end submerged in said body of quench liquid in said quenching zone, said quench liquid irrigating the entire surface of said conduit;

irrigating all of the internal surfaces of said quenching zone with the quench liquid;

introducing gas from said thermal unit into said quenching zone through said conduit whereby the introduced gas flowing through the submerged outlet end of said conduit bubbles through said body of quench liquid whereby the gas is quenched by said quench liquid;

subsequently separating the quenched gas and the quench liquid in said quenching zone;

passing separated quench liquid from said quenching zone to a heat recovery unit having a heat recovery surface for recovery of heat from said quenched gas;

irrigating, with said separated quench liquid, all of said heat recovery surfaces of said heat recovery unit;

separately passing seperated quenched gas from said quenching zone to said heat recovery unit; and recovering heat from said quenched gas in said heat recovery unit.

* * * * *